United States Patent [19]
Gohlisch et al.

[11] Patent Number: 5,304,053
[45] Date of Patent: Apr. 19, 1994

[54] APPARATUS FOR EXTRUSION OF PLASTIC AND/OR RUBBER MIXTURES

[75] Inventors: Hans-Joachim Gohlisch, Hanover; Wilfried Baumgarten, Pattensen, both of Fed. Rep. of Germany

[73] Assignee: Paul Troester Maschinenfabrik, Hanover, Fed. Rep. of Germany

[21] Appl. No.: 880,232

[22] Filed: May 8, 1992

[30] Foreign Application Priority Data

May 10, 1991 [DE] Fed. Rep. of Germany ....... 4115246

[51] Int. Cl.$^5$ ............................................. B29C 47/00
[52] U.S. Cl. ...................................... 425/204; 366/81; 366/91; 366/299; 425/205; 425/208; 425/382.3
[58] Field of Search .......... 264/176.1, 211.21, 211.23; 366/81, 91, 97, 98, 99, 299; 425/200, 204, 205, 206, 207, 208, 209, 376.1, 382.3, 382.4, 461

[56] References Cited

U.S. PATENT DOCUMENTS

| | | | |
|---|---|---|---|
| 2,814,827 | 12/1957 | Snow et al. | 425/207 |
| 3,130,448 | 4/1964 | Tomlinson | 425/208 |
| 4,259,277 | 3/1981 | Hill | 425/382.3 |
| 4,310,251 | 1/1982 | Scharer et al. | 425/208 |
| 4,336,213 | 6/1982 | Fox | 425/382.3 |
| 4,515,512 | 5/1985 | Hertell et al. | 425/382.3 |
| 4,820,469 | 4/1989 | Walsh et al. | 425/382.3 |
| 4,963,309 | 10/1990 | Gohlisch et al. | 425/382.3 |
| 5,061,170 | 10/1991 | Allen et al. | 425/208 |

FOREIGN PATENT DOCUMENTS

| | | | |
|---|---|---|---|
| 949811 | 9/1956 | Fed. Rep. of Germany | 425/204 |
| 1216478 | 5/1966 | Fed. Rep. of Germany | 425/382.3 |

Primary Examiner—Charles S. Bushey
Attorney, Agent, or Firm—Robert E. Burns; Emmanuel J. Lobato

[57] ABSTRACT

Apparatus for extruding plastic and/or rubber material has a screw extruder, which plasticizes the material and delivers it to a gear pump which develops sufficient pressure for extrusion of the material through an extrusion head. The apparatus is characterized by the fact that the axes of gears of the gear pump and the axis of the screw of the extruder are parallel to one another. The housing of the gear pump has a side opening into which a cylindrical bushing and the screw of the extruder extend so that the material is delivered by the extruder directly to the gear pump as a non-oriented plasticized mass. The extrusion head may be a transverse extrusion head with an axis parallel to the axes of the gear wheels of the gear pump and the axis of the screw of the extruder. A second like extrusion apparatus including a screw extruder and a gear pump may be connected to an opposite side of the extrusion head.

4 Claims, 7 Drawing Sheets

APPARATUS FOR EXTRUSION OF PLASTIC AND/OR RUBBER MIXTURES

FIELD OF INVENTION

The invention relates to apparatus for extrusion of plastic and/or rubber mixtures consisting of at least one screw extruder followed by a gear pump and an extrusion head.

BACKGROUND OF THE INVENTION

Apparatus of this kind has become known from DE-OS 27 00 003. This known apparatus serves for the production of strand profiles from plastic materials. In the screw extruder of this apparatus the plastic material is melted, then passed through a strainer in order to remove any foreign particles from the molten plastic material whereupon the molten and strained plastic material is led to a gear pump which imparts to the molten plastic material sufficient pressure to force it through an extrusion head secured on the outlet of the gear pump and thereby extrude the desired profile. The advantage of using a gear pump in the extrusion installation is that a very uniform pressure can be produced for the extrusion of the material from the extrusion head. A further advantage of the gear pump in such extrusion installation is that the screw of the extruder can be shorter than usual because the screw serves only for disintegration of the plastic material to a low viscosity homogenous mass and is not required to build up the pressure necessary for the extrusion from the extrusion head. The extrusion installation can hence be made shorter than the usual screw extruder of which the screw serves not only for the disintegration work but also for the work of building up the extrusion pressure. This advantage is not realized by DE-OS 27 00 003 where the construction units are arranged in a straight production line far apart from one another so that a considerable amount of room is needed.

With this known extrusion installation the axes of the gear wheels of the gear pump are arranged perpendicular to (and offset from) the axis of the screw of the extruder. This arrangement is also usual in screw extruder and gear pump extrusion installations for plastic material.

Such extrusion installations consisting of a screw extruder and gear pump have not heretofore been employed in working with rubber mixtures. Rubber mixtures plasticized in a screw extruder exhibit different molecular structure from molten plastic material. They erode gear pumps by reason of their abrasive character and can lead to break downs.

Recent special knowledge attributes this fault to the fact that the strand of the plasticized rubber mixture led into the gear pump leads to damage of the gear pump by its molecular alignment. This knowledge suggests that damage to the gear pump can be avoided by arranging the gear pump directly behind the tip of the screw of the screw extruder so that a gear pump receives from the extruder a plasticized rubber mixture which has not yet been formed into a strand. This arrangement leads also to a very short type of construction of the extruder installation.

SUMMARY OF THE INVENTION

It is the object of the present invention to bring the gear wheels of the gear pump close to the end of the screw of the extruder so that by the processing of the rubber mixture the mass which is plasticized in the extruder and is in disordered movement is delivered by the shortest possible path to the gear wheels of the gear pump.

Another object of the present invention is to improve the mixing effect for the extruded mass by passage through the extruder-gear pump combination and to equalize radial temperature differentials formed in the extruder and other non-uniformities.

It is a further object of the present invention to decrease still further the space required for the extrusion installation. In particular, by the use of transverse extrusion heads as for the sheathing of bars, wires and cables, there is a requirement for considerable room for extrusion installations which work only with a screw extruder and not with a screw extruder-gear pump combination. In the use of such transverse extrusion heads, the screw extruder is arranged with its screw axis perpendicular to the axis of the object that is to be sheathed with the extrudant. If such extrusion head is to apply two sheaths, both extruders are arranged with their screw axis perpendicular to the axis of the transverse extrusion head but usually not on the same side of the extrusion head but on opposite sides of the extrusion head. The space required for such construction presents a problem for arrangement of the apparatus in a factory.

The present invention avoids the disadvantages of the state of the art. It is the object of the present invention to form extrusion apparatus consisting of a screw extruder and gear pump in such manner that little space is needed for the installation for processing difficult rubber mixtures without problems.

The invention resides therein that the axes of the gear wheels of the gear pump and the screw of the extruder are arranged parallel, or approximately parallel (at an acute angle), to one another.

With this arrangement of the axes of the gear wheels, the gear wheels can be arranged very close to the screw or the screw end of the extruder so that the extruded mass in disordered movement can be delivered to the gear pump in this state. This leads to problem free processing of even difficult rubber mixtures. At the same time, the space requirement of the apparatus is decreased, in particular, when the forming of the disintegrated and plasticized mass is effected in a transverse extrusion head. For with this arrangement the axes of the screw, the gear wheels and the extrusion head can be arranged in a simple manner so that a wire or cable to which a sheath is to be applied lies parallel to the axis of the screw of the extruder and the axes of the gear wheels of the gear pump.

This particular close arrangement of the gear wheels on the end of the screw of the extruder can be realized in two simple and efficacious manners.

One possibility resides therein that the housing of the gear pump (seen in a radial direction) has on one side an opening to receive the end of the extruder screw which extends into the opening which ends in a flange to which a flange on the end of the extruder cylinder is secured. By this construction, the end of the screw extends into the housing of the gear pump.

The other construction possibility resides therein that the extruder cylinder and/or the cylinder bushing has at least one outlet slit in its circumference and the housing of the gear pump has an inlet opening at the location of the outlet slit of the extruder. With this embodiment, the housing of the gear pump, which only partially encloses the gear wheels i.e. in a radial direction, is mounted on the extruder cylinder Which no longer has an outlet opening at its end but has at least one outlet opening, preferably in the form of one or more through openings, in the cylinder wall so that the circumference of the cylinder is interrupted by this opening or these openings. Through diversified form, size and arrangement of the through openings, different transfer velocities and thereby subsequent homogenizing effects can be attained.

It is advantageous when the gear wheels of the gear pump have an unequal number of teeth. In this manner a further mixing effect of the extrusion apparatus can be attained.

It is also advantageous when at the outlet of the gear pump there is provided a homogenizing device with a rotating shear spindle of which the axis runs parallel or approximately parallel to the axes of the gear wheels and the axis of the extruder screw. Also through this arrangement the space required is less than for conventional apparatus.

The same effect is attained when on the outlet side of the gear pump there is arranged a transverse extrusion head the axis of which is parallel to the axes of the gear wheels and the axis of the extruder screw.

With the use of a transverse extrusion head of this kind it is especially advantageous when a further extrusion installation consisting of a screw extruder and a gear pump is attached to the transverse extrusion head, whereby the axes of the screws, the gear wheels and the transverse extrusion head run parallel to one another.

It is advantageous when the extruder screw has in its end region an increased number of turns per unit length.

When the extrusion apparatus of the present invention does not convey the extrudant over the tip of the screw but allows it to exit radially of the screw axis, it can happen that extrudant at the end of the screw extruder remains stationary and leads to damage, for example disintegration of the molecules, pre-cross linking or pre-vulcanization. This can be avoided by providing a by-pass channel which extends at least two screw turns in a direction contrary to the forward direction of the screw or by providing in the end face a radial channel, for example in the form of a groove, which extends to the gear pump.

A further possibility consists therein that the core of the extruder screw is stronger and preferably is formed conically in the region of the outlet opening.

In many cases it is advantageous when on the end of the extruder screw there is arranged a mixing or shearing zone which is integral with a stronger screw core.

BRIEF DESCRIPTION OF DRAWINGS

The nature of the invention will be more fully understood with the following description of preferred embodiments shown schematically in the accompanying drawings in which.

DESCRIPTION OF PREFERRED EMBODIMENTS

Figure 1:
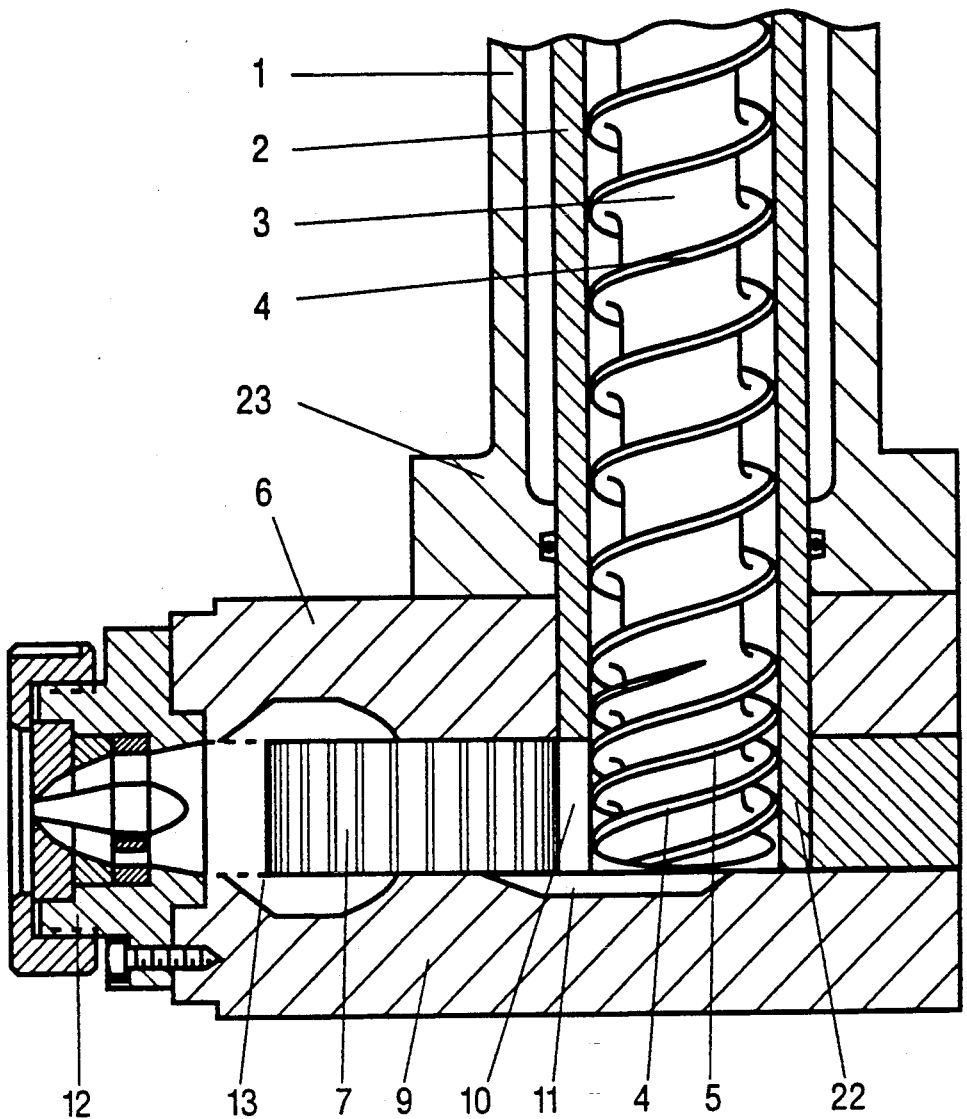
FIG. 1 is a longitudinal section through extrusion apparatus in accordance with the invention.
Figure 2:
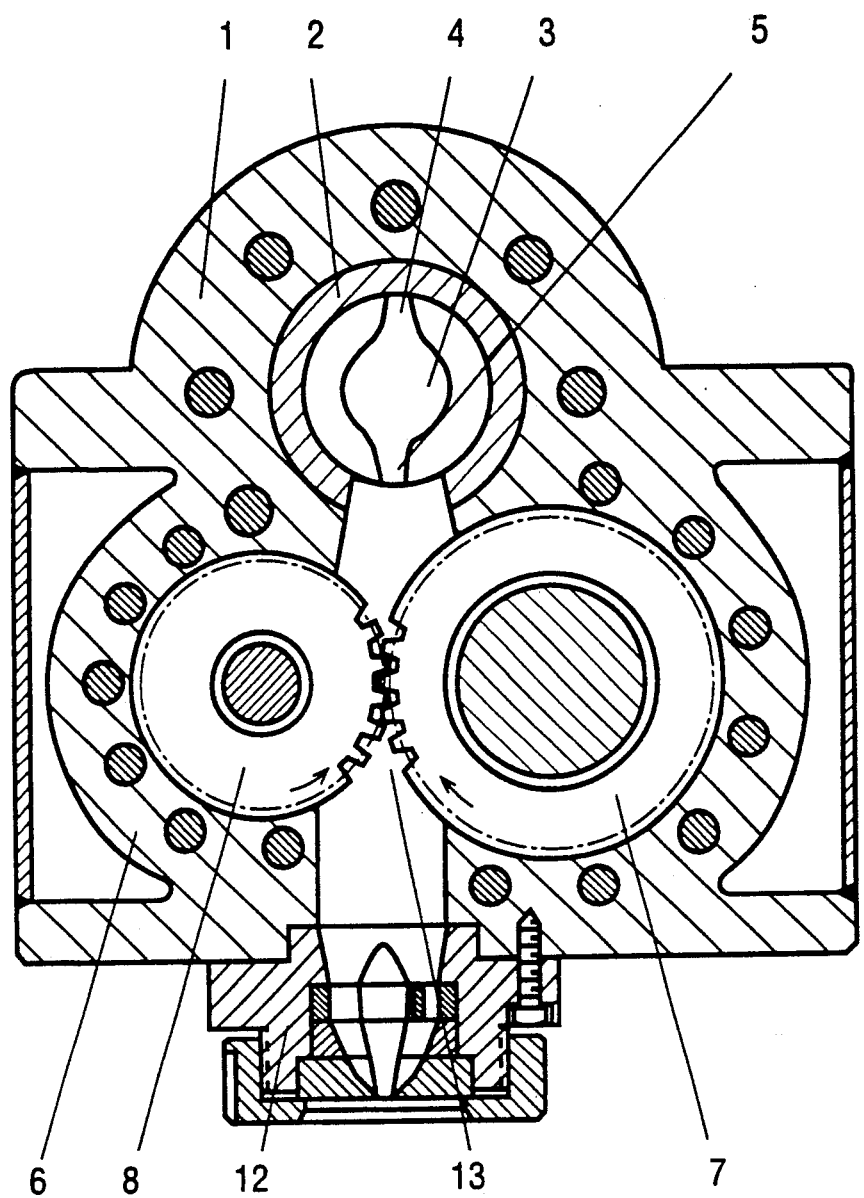
FIG. 2 is a cross section through the screw extruder, the gear pump and the extrusion head of this extrusion apparatus.

In the apparatus shown in FIGS. 1 and 2 the cylinder 1 of the extruder is provided with an inner cylindrical bushing 2 in which the rotating extruder screw 3 disintegrates or plasticizes the extrudant. The extruder screw 3 has one or two continuous helical flights over a major portion of its length but in the end region has a further helical flight 5. The cylinder bushing 2 and the screw extruder 3 extend into the housing 6 of the gear pump in which the gear wheels 7, 8 are driven in rotation by a motor (not shown). As the housing wall 9 of the gear pump closes the end of the cylinder bushing 2, the extrudant enters the gear pump 6 through a through opening 10 in the cylinder bushing 2. In order to assure proper flow of the extrudant from the region from the end of the extruder screw, it is advantageous when in the housing wall 9 there is provided a channel 11 in the form of a groove which extends from the region of the screw end to the tooth inlet.

On the outlet side of the housing 6 of the gear pump there is mounted an extrusion head 12. In order to assure proper flow of those portions of the extrudant which, in the region of the interengaging teeth of the gear wheels 7 and 8, are squeezed out to the end faces of the gear wheels, it is advantageous to provide on both sides of the gear wheels 7 and 8 channels 13 which extend from the region of the interengaging teeth of the gear wheels in the direction to the outlet of the gear pump.

Figure 3:
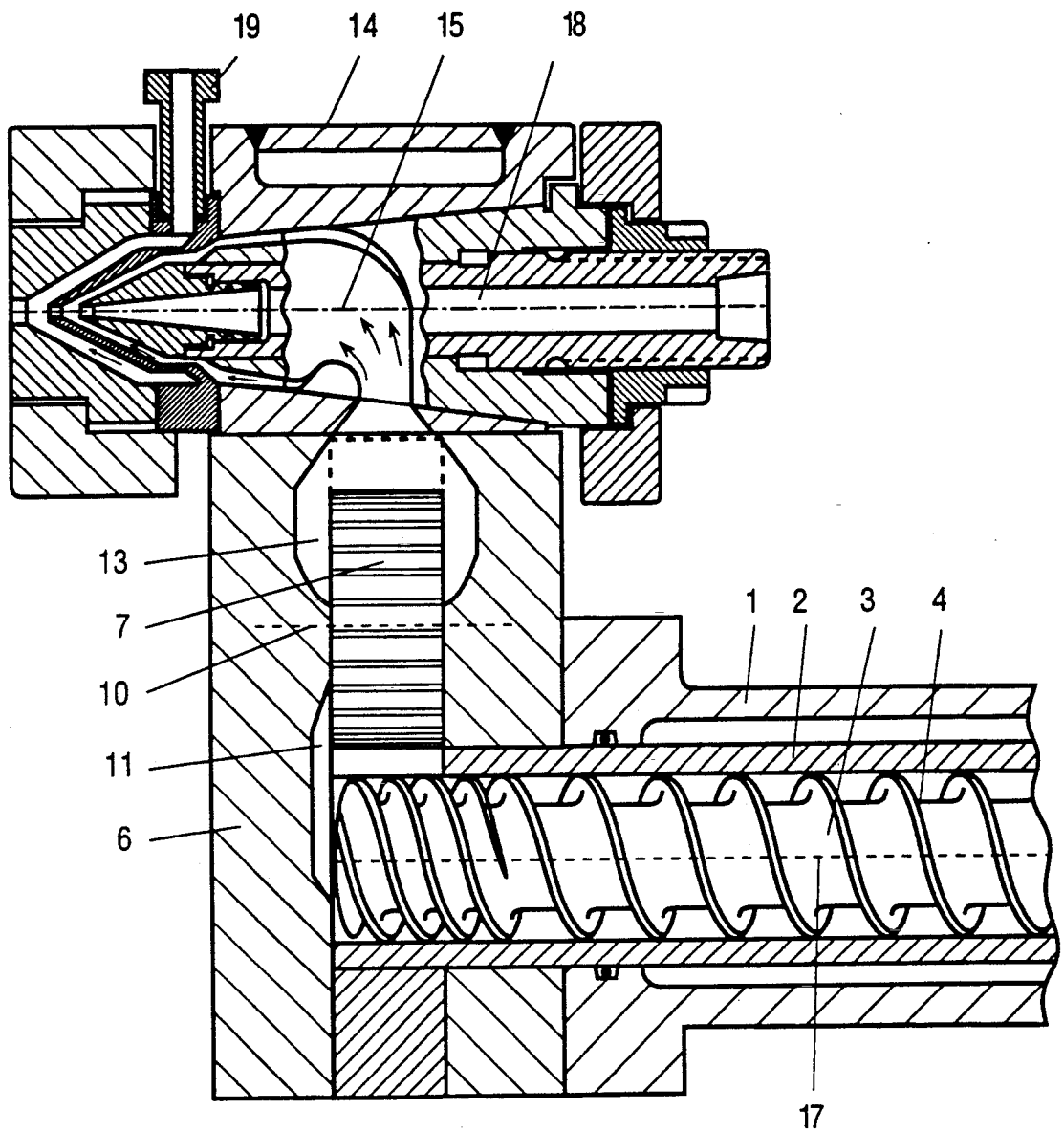
FIG. 3 is a longitudinal section through extrusion apparatus with a transverse extrusion head.
Figure 4:
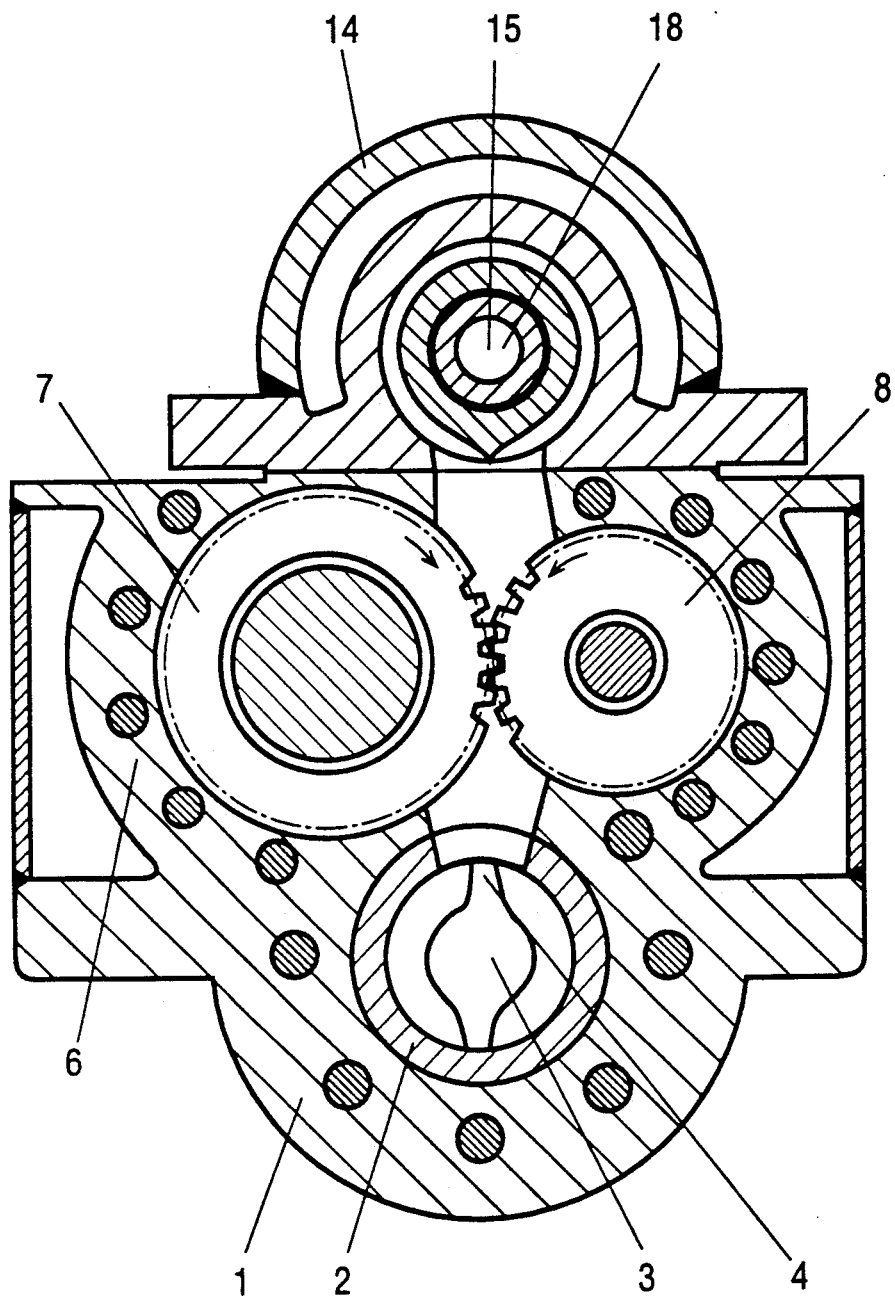
FIG. 4 is a cross section of the apparatus shown in FIG. 3.
Figure 5:
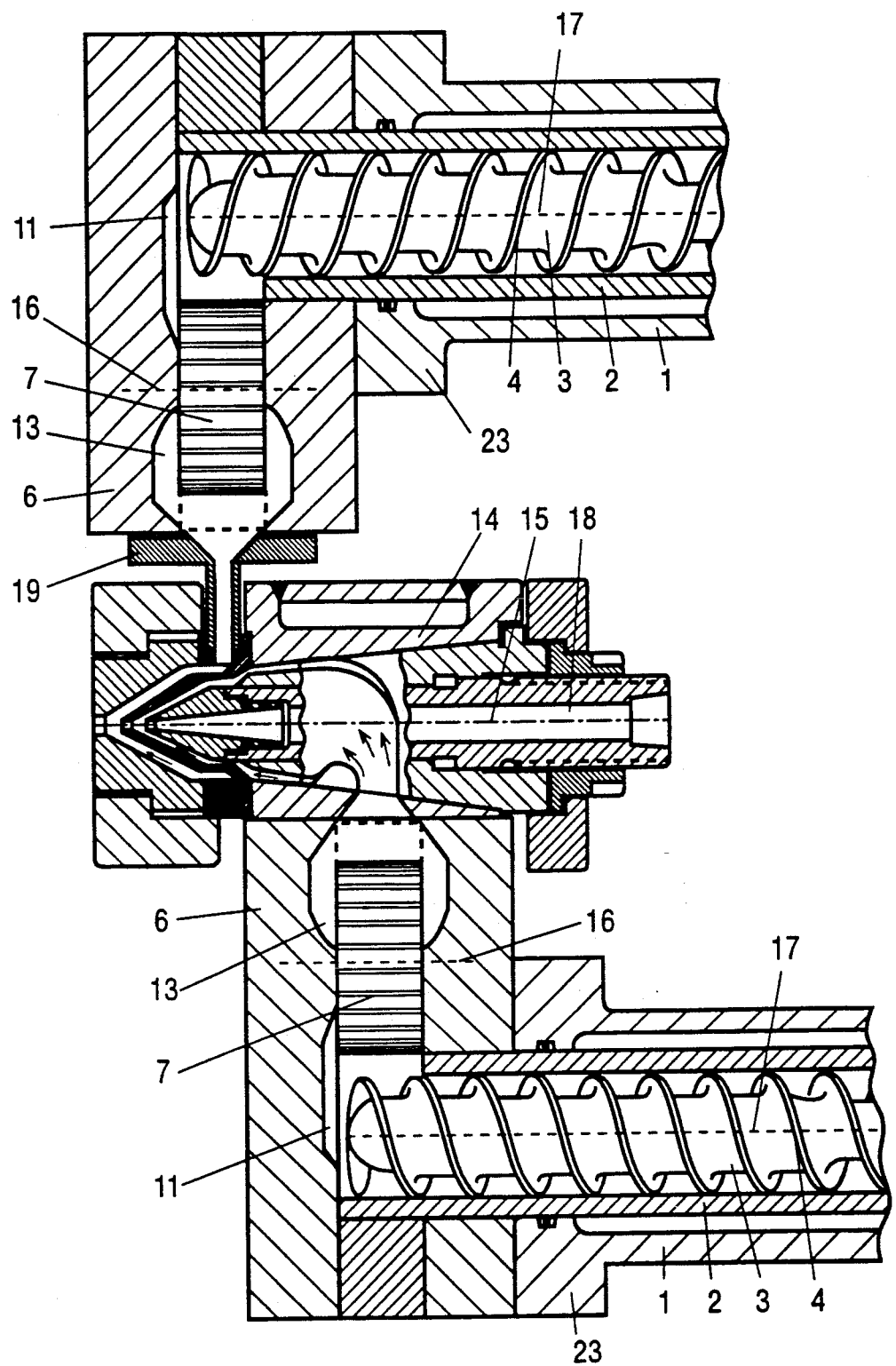
FIG. 5 is a longitudinal section through extrusion apparatus with two screw extruders and a transverse extrusion head.

As seen in the embodiment illustrated in FIGS. 3 and 4, the extrusion head can be a transverse extrusion head 14 of which the axis 15 is arranged parallel to the axes 16 of the gear wheels and parallel to the axis 17 of the extruder screw 3. This transverse extrusion head 14 has a central through opening 18 for passage of an object to be sheathed. Moreover this transverse extrusion head has a connection 19 for a further extrusion apparatus which is illustrated in FIG. 5. Also this extrusion apparatus can consist of the combination of a screw extruder with a gear pump whereby both extruder screws 3 run parallel to one another and parallel to the axes 16 of the gear wheels 7, 8 and parallel to the axis 15 of the transverse extrusion head 14.

Figure 6:
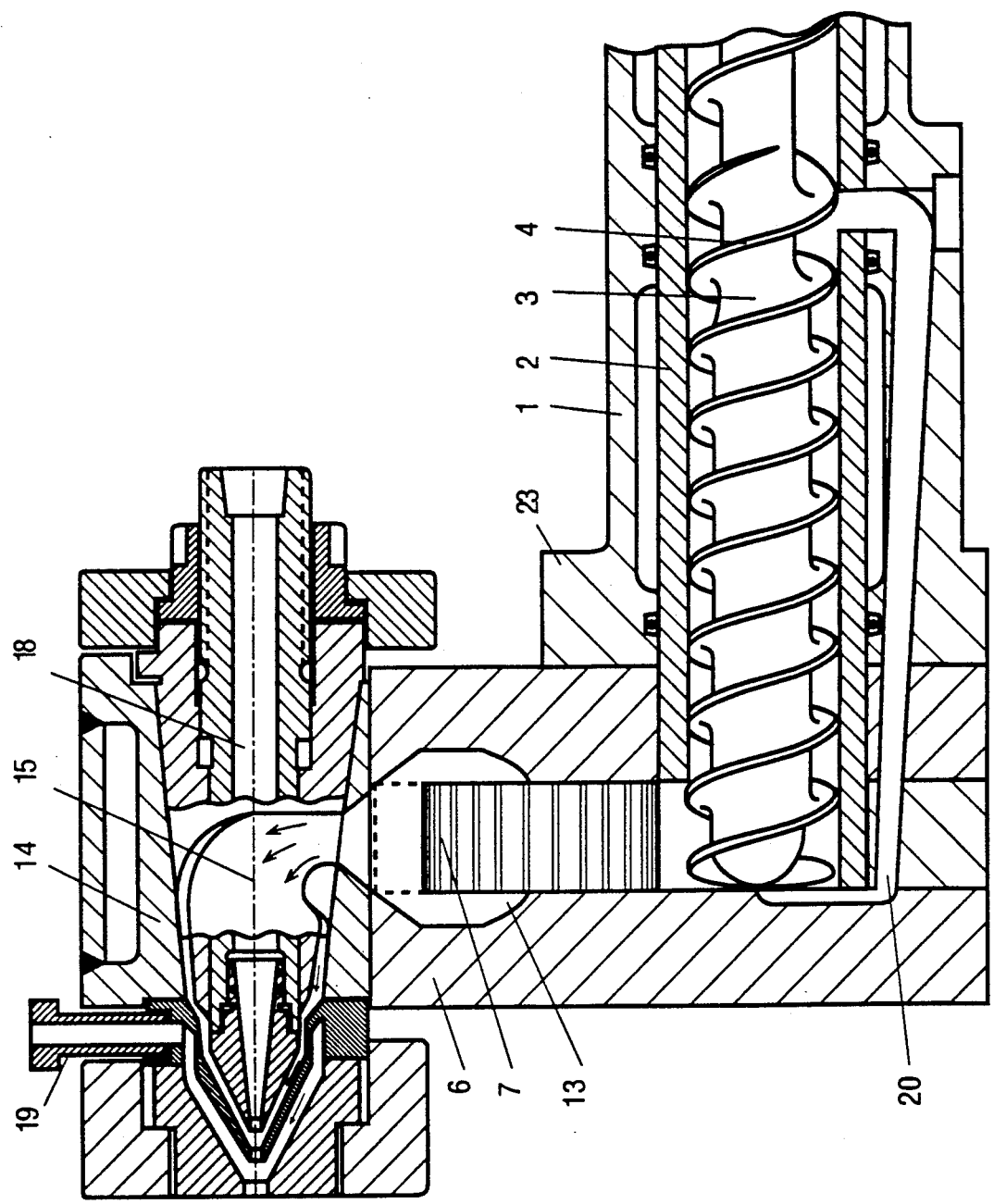
FIG. 6 is a longitudinal section through extrusion apparatus with a bypass in the screw extruder.

In order to prevent extrudant damage at the end of the extruder, for example through pre-vulcanization, there is provided in the screw extruder a bypass 20 which conducts extrudant from the end of the cylindrical inner space of the extruder back two or more turns of the screw as illustrated in FIG. 6.

Figure 7:
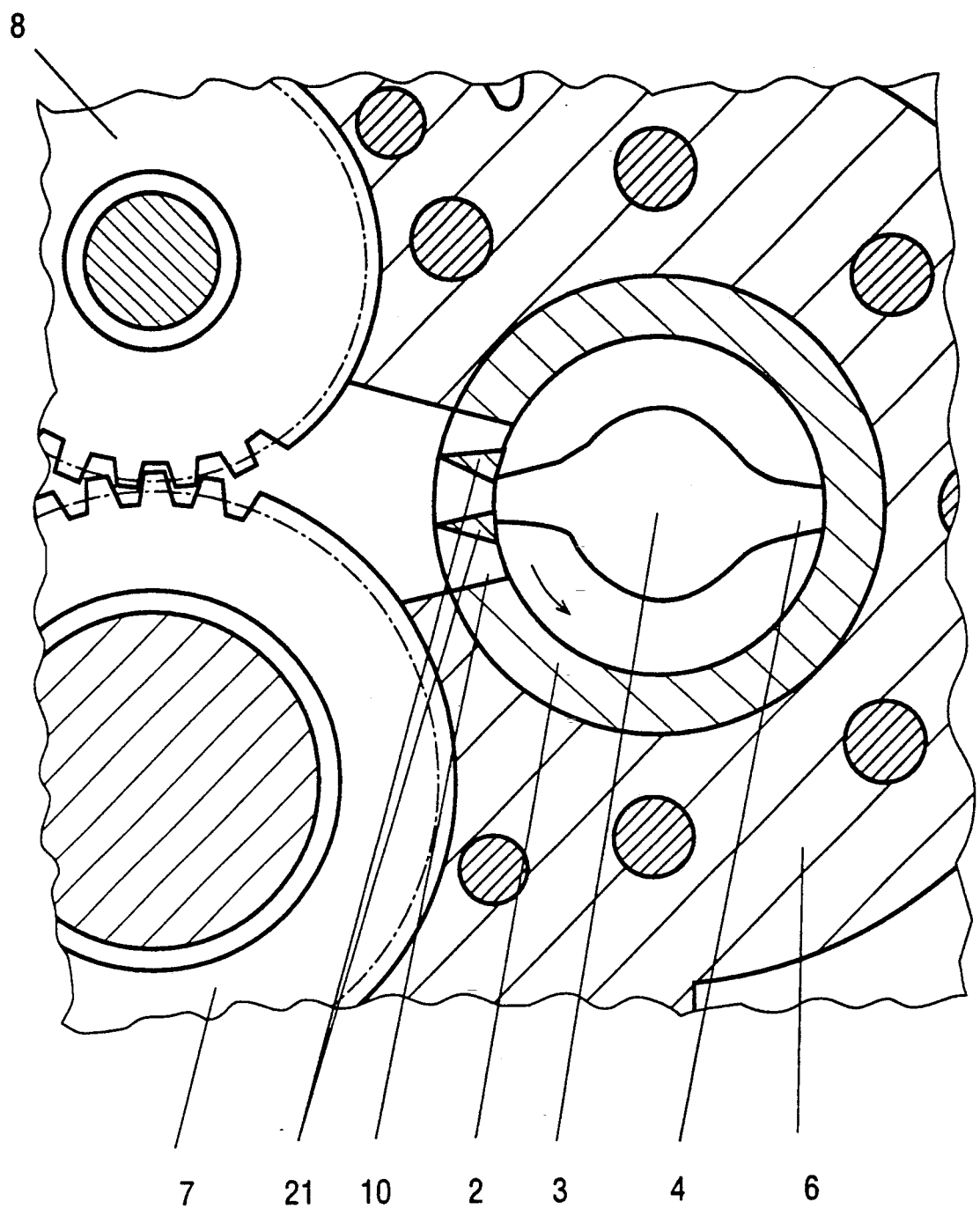
FIG. 7 is a cross section through extrusion apparatus with a through opening in the cylinder of the screw extruder.

In the embodiment illustrated in FIG. 7, the cylinder bushing 2 has several through openings 10 which have the advantage that the extrudant in passage out of the cylinder bushing and into the inlet of the gear pump is subjected to a further mixing effect. This can be further intensified through special formation of the through openings or of the portions 21 between the through openings 10. The arrangement, form and size of the through openings can have an influence on the mixing effect.

What I claim is:

1. Apparatus for extrusion of viscous material selected from the group consisting of plastic material and elastomeric material comprising a gear pump comprising a housing having a gear chamber, an inlet passage opening into said gear chamber and a discharge passage opening out of said gear chamber, two intermeshing gears rotatable in said gear chamber about parallel axes, said intermeshing gear wheels having an inlet bight opening into said inlet passage and a discharge bight opening into said discharge passage, said housing having a blind cylindrical bore which extends into said housing parallel to said axes of said gear wheels and has an inner end closed by a wall of said housing, said cylindrical bore communicating with said inlet passage of said housing, a screw extruder comprising an extruder cylinder, a cylindrical bushing in said cylinder and an extruder screw rotatable in said bushing, said extruder screw having at least one continuous helical flight through its length, said screw extruder being assembled with said gear pump with an end portion of said cylindrical bushing extending into said cylindrical bore of said gear pump housing and with an axis of rotation of said extruder screw parallel to and spaced laterally from said axes of rotation of said gears of said gear pump.

2. Apparatus according to claim 1, in which an end of said cylindrical bushing is closed by a wall of said gear pump housing and in which said cylindrical bushing has in an end portion thereof a lateral opening in communication with said inlet passage of said gear pump housing.

3. Apparatus according to claim 1 in which said screw of said extruder has on an end portion thereof an additional helical flight having convolutions interposed between convolutions of said continuous helical flight.

4. Apparatus according to claim 1 in which said gear pump housing has channels on opposite sides of said gear wheels which extend from a region of interengaging teeth of said gear wheels toward said discharge passage of said gear pump housing.

* * * * *